United States Patent
Li et al.

(10) Patent No.: US 11,038,640 B2
(45) Date of Patent: Jun. 15, 2021

(54) LOW OVERHEAD SUBBAND PHYSICAL DOWNLINK CONTROL FOR COMMUNICATION SYSTEMS

(71) Applicant: Apple Inc., Cupertino, CA (US)

(72) Inventors: Qian Li, Beaverton, OR (US); Guangjie Li, Beijing (CN); Xiaoyun Wu, Minhang (CN); Geng Wu, Portland, OR (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/475,782

(22) PCT Filed: Dec. 29, 2017

(86) PCT No.: PCT/US2017/068925
§ 371 (c)(1),
(2) Date: Jul. 3, 2019

(87) PCT Pub. No.: WO2018/128922
PCT Pub. Date: Jul. 12, 2018

(65) Prior Publication Data
US 2019/0349153 A1    Nov. 14, 2019

Related U.S. Application Data

(60) Provisional application No. 62/443,272, filed on Jan. 6, 2017.

(51) Int. Cl.
*H04L 5/00* (2006.01)
*H04W 72/08* (2009.01)

(52) U.S. Cl.
CPC .......... *H04L 5/0037* (2013.01); *H04L 5/0005* (2013.01); *H04L 5/0044* (2013.01);
(Continued)

(58) Field of Classification Search
CPC . H04W 72/0453; H04W 24/10; H04W 72/04; H04W 72/042
See application file for complete search history.

(56) References Cited

U.S. PATENT DOCUMENTS 9,131,405 B2 * 9/2015 Park .................. H04L 1/0035
2012/0064933 A1   3/2012 Sakata et al.

FOREIGN PATENT DOCUMENTS

EP    3208961 A1    8/2017
WO    2016070425 A1    5/2016

OTHER PUBLICATIONS

International Search Report dated Mar. 29, 2018 for International Application No. PCT/US2017/068925.
(Continued)

*Primary Examiner* — Chandrahas B Patel
(74) *Attorney, Agent, or Firm* — Eschweiler & Potashnik, LLC

(57) ABSTRACT

An apparatus is configured to be employed within a base station. The apparatus comprises baseband circuitry which includes a radio frequency (RF) interface and one or more processors. The one or more processors are configured to obtain channel information and data information for a user equipment (UE) device, determine control information for the UE device based on the obtained channel information and data information, generate a channel format for the determined control information and having varied subband sizes, and provide the channel format to the RF interface for a downlink transmission to the UE device.is configured to be employed within a base station.

24 Claims, 9 Drawing Sheets

(52) U.S. Cl.
CPC .......... *H04L 5/0053* (2013.01); *H04L 5/0094* (2013.01); *H04W 72/087* (2013.01)

(56) References Cited

OTHER PUBLICATIONS

"Shortened TTI design." Source: Motorola Mobility. Agenda Item: 72.101.1. 3GPP TSG RAN WG1#86bis, Oct. 10-14, 2016, Lisbon, Portugal. R1-1609914. 6 pages.

\* cited by examiner

DL DOWNLINK CONTROL INFORMATION AT VARIED SUBBAND SIZES

| CONTROL AND DATA SUBBAND SIZE | DCI CONTENT AND RESOURCE MAPPING |
|---|---|
| 1 RESOURCE BLOCK (RB) | EXPLICIT SIGNALING ON RESOURCE ALLOCATION NOT REQUIRED; CONTROL IS TRANSMITTED IN THE SAME RBs ASSIGNED FOR DATA; AND CRNTI SYMBOL LEVEL SCRAMBLE WITH MODULATED DATA |
| 2/3/4 RBs | EXPLICIT SIGNALING ON RESOURCE ALLOCATION NOT REQUIRED; AND CONTROL IS TRANSMITTED IN THE SAME RBs ASSIGNED FOR DATA |
| 5 RB | RESOURCE ALLOCATION (20 BITS), ANTENNA PORTS (5 BITS), DMRS CYCLIC SHIFT FOR UL SLOT (2 BITS), CRC (16 BITS) |

FIG. 6

LOW OVERHEAD SUBBAND PHYSICAL DOWNLINK CONTROL FOR COMMUNICATION SYSTEMS

REFERENCE TO RELATED APPLICATIONS

This application is a National Phase entry application of International Patent Application No. PCT/US2017/068925 filed Dec. 29, 2017, which claims priority to U.S. Provisional Application No. 62/443,272 filed Jan. 6, 2017, entitled "LOW OVERHEAD SUBBAND PHYSICAL DOWNLINK CONTROL FOR COMMUNICATION SYSTEMS" in the name of Qian Li et al. and is hereby incorporated by reference in its entirety.

FIELD

Various embodiments generally relate to the field of wireless communications.

BACKGROUND

Wireless or mobile communication involves wireless communication between two or more devices. The communication requires resources to transmit data from one device to another and/or to receive data at one device from another.

Communications are performed using physical channels having physical resources. The resources can be assigned to particular devices so that the devices can identify resources that carry or convey information for them and can ignore resources for other devices.

The devices can identify the resources by control information, which specifies resources allocated or assigned to particular devices. Thus, a device can use control information to then receive or transmit data using the assigned resources.

What is needed are techniques to facilitate generating control information and assigning resources.

BRIEF DESCRIPTION OF THE DRAWINGS

FIG. 6 is a table illustrating downlink control information (DCI) with various control and data subband sizes in accordance with some embodiments.

DETAILED DESCRIPTION

Figure 1:
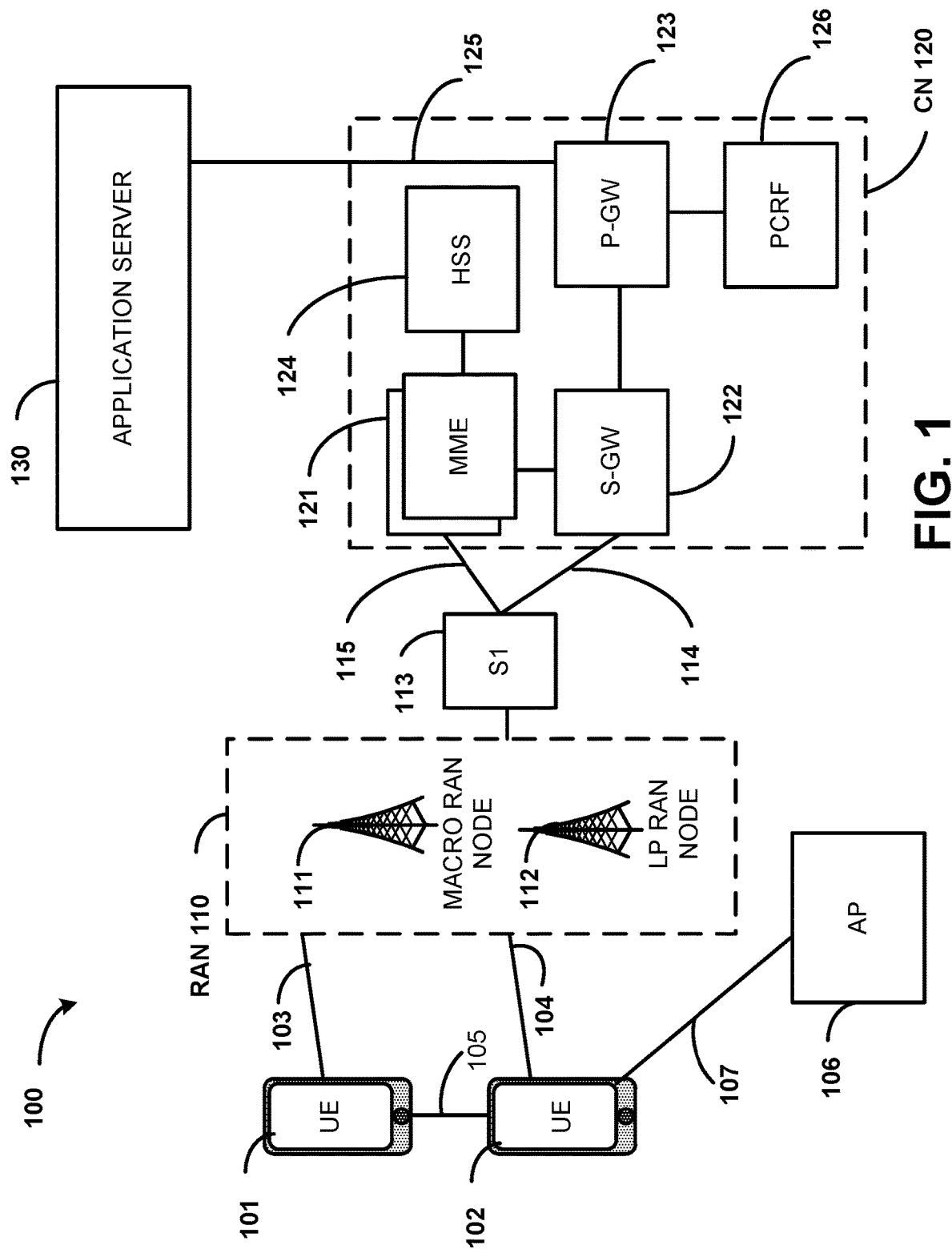
FIG. 1 illustrates a block diagram of an example wireless communications network environment for a network device (e.g., a UE, gNB or an eNB) according to various aspects or embodiments.

The present disclosure will now be described with reference to the attached drawing figures, wherein like reference numerals are used to refer to like elements throughout, and wherein the illustrated structures and devices are not necessarily drawn to scale. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of various embodiments. However, it will be apparent to those skilled in the art having the benefit of the present disclosure that the various aspects of the various embodiments may be practiced in other examples that depart from these specific details. In certain instances, descriptions of well-known devices, circuits, and methods are omitted so as not to obscure the description of the various embodiments with unnecessary detail. Embodiments herein may be related to RAN1 and 5G.

As utilized herein, terms "component," "system," "interface," and the like are intended to refer to a computer-related entity, hardware, software (e.g., in execution), and/or firmware. For example, a component can be a processor, a process running on a processor, a controller, an object, an executable, a program, a storage device, and/or a computer with a processing device. By way of illustration, an application running on a server and the server can also be a component. One or more components can reside within a process, and a component can be localized on one computer and/or distributed between two or more computers. A set of elements or a set of other components can be described herein, in which the term "set" can be interpreted as "one or more."

Further, these components can execute from various computer readable storage media having various data structures stored thereon such as with a module, for example. The components can communicate via local and/or remote processes such as in accordance with a signal having one or more data packets (e.g., data from one component interacting with another component in a local system, distributed system, and/or across a network, such as, the Internet, a local area network, a wide area network, or similar network with other systems via the signal).

As another example, a component can be an apparatus with specific functionality provided by mechanical parts operated by electric or electronic circuitry, in which the electric or electronic circuitry can be operated by a software application or a firmware application executed by one or more processors. The one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components.

Use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form. Furthermore, to the extent that the terms "including", "includes", "having", "has", "with", or variants thereof are used in either the detailed description and the claims, such terms are intended to be inclusive in a manner similar to the term "comprising".

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

It is appreciated that there is a continuing need to improve data rates and performance without using additional bandwidth and/or modulation types. Techniques for improving data rates can include lowering overhead and/or better utilizing resources.

Downlink (DL) control information (DCI) is control information that allocates system or physical resources for downlink and/or uplink channels. However, the DCI itself can consume large amounts of system resources and constrain system performance in aspects such as number of user equipment (UEs) that can be served in each slot, UE power consumption, and latency and throughput.

Generally, the DCI provides control information including resource allocation information. For example, in LTE, 25 bits are used in the DCI to signal the resource allocation bitmap for a 20 MHz system bandwidth. Considering 16 bits CRC, 1/3-rate channel coding and QPSK modulation, and assuming 2 resource elements (REs) per resource block (RB) for demodulation reference signals (DMRS), there are 7 resource blocks (RB, in LTE and NR, 1 RB=12 subcarriers over 1 symbol) to transmit the resource allocation information, even for a data channel allocation containing 4 PRBs. As a result, at least 2 symbols need to be assigned for a control channel to support serving 25 UEs in a slot each with a resource allocation of 4 PRBs.

Reducing resource allocation granularity to less than 4 PRBs can further increase the control overhead in signal the resource allocation. Such a large DL control payload (DCI) not only adds to the overhead, but also consumes UE power in decoding the DL control. Further, the large DCI also increases control channel detection latency.

The same control channel design principle as in LTE may not be sufficient for new radio access technology (NR), where latency, power consumption, number of connections, and system capacity can be orders of magnitude better than LTE.

It is appreciated that techniques to reduce the DCI size, control overhead and improve DL control efficiency are needed.

Embodiments are disclosed that include and/or techniques to reduce overhead associated with control information (the DCI size) and/or improve DL control efficiency. The techniques include assigning and/or varying subband sizes for control information in a control band/channel to identify resources for a data band/channel.

FIG. 1 illustrates an architecture of a system 100 of a network in accordance with some embodiments. The system 100 is shown to include a user equipment (UE) 101 and a UE 102. The UEs 101 and 102 are illustrated as smartphones (e.g., handheld touchscreen mobile computing devices connectable to one or more cellular networks), but can also comprise any mobile or non-mobile computing device, such as Personal Data Assistants (PDAs), pagers, laptop computers, desktop computers, wireless handsets, or any computing device including a wireless communications interface.

In some embodiments, any of the UEs 101 and 102 can comprise an Internet of Things (IoT) UE, which can comprise a network access layer designed for low-power IoT applications utilizing short-lived UE connections. An IoT UE can utilize technologies such as machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data can be a machine-initiated exchange of data. An IoT network describes interconnecting IoT UEs, which can include uniquely identifiable embedded computing devices (within the Internet infrastructure), with short-lived connections. The IoT UEs can execute background applications (e.g., keep-alive messages, status updates, etc.) to facilitate the connections of the IoT network.

The UEs 101 and 102 can be configured to connect, e.g., communicatively couple, with a radio access network (RAN) 110—the RAN 110 can be, for example, an Evolved Universal Mobile Telecommunications System (UMTS) Terrestrial Radio Access Network (E-UTRAN), a NextGen RAN (NG RAN), or some other type of RAN. The UEs 101 and 102 utilize connections 103 and 104, respectively, each of which comprises a physical communications interface or layer (discussed in further detail below); in this example, the connections 103 and 104 are illustrated as an air interface to enable communicative coupling, and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a fifth generation (5G) protocol, a New Radio (NR) protocol, and the like.

In this embodiment, the UEs 101 and 102 can further directly exchange communication data via a ProSe interface 105. The ProSe interface 105 can alternatively be referred to as a sidelink interface comprising one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH).

The UE 102 is shown to be configured to access an access point (AP) 106 via connection 107. The connection 107 can comprise a local wireless connection, such as a connection consistent with any IEEE 802.11 protocol, wherein the AP 106 would comprise a wireless fidelity (WiFi®) router. In this example, the AP 106 is shown to be connected to the Internet without connecting to the core network of the wireless system (described in further detail below).

The RAN 110 can include one or more access nodes that enable the connections 103 and 104. These access nodes (ANs) can be referred to as base stations (BSs), NodeBs, evolved NodeBs (eNBs), next Generation NodeBs (gNB), RAN nodes, and so forth, and can comprise ground stations (e.g., terrestrial access points) or satellite stations providing coverage within a geographic area (e.g., a cell). A network device as referred to herein can include any one of these APs, ANs, UEs or any other network component. The RAN 110 can include one or more RAN nodes for providing macrocells, e.g., macro RAN node 111, and one or more RAN nodes for providing femtocells or picocells (e.g., cells having smaller coverage areas, smaller user capacity, or higher bandwidth compared to macrocells), e.g., low power (LP) RAN node 112.

Any of the RAN nodes 111 and 112 can terminate the air interface protocol and can be the first point of contact for the UEs 101 and 102. In some embodiments, any of the RAN nodes 111 and 112 can fulfill various logical functions for the RAN 110 including, but not limited to, radio network controller (RNC) functions such as radio bearer management, uplink (UL) and downlink (DL) dynamic radio resource management and data packet scheduling, and mobility management.

In accordance with some embodiments, the UEs 101 and 102 can be configured to communicate using Orthogonal Frequency-Division Multiplexing (OFDM) communication signals with each other or with any of the RAN nodes 111 and 112 over a multicarrier communication channel in accordance various communication techniques, such as, but not limited to, an Orthogonal Frequency-Division Multiple Access (OFDMA) communication technique (e.g., for downlink communications) or a Single Carrier Frequency Division Multiple Access (SC-FDMA) communication technique (e.g., for uplink and ProSe or sidelink communications), although the scope of the embodiments is not limited in this respect. The OFDM signals can comprise a plurality of orthogonal subcarriers.

In some embodiments, a downlink resource grid can be used for downlink transmissions from any of the RAN nodes 111 and 112 to the UEs 101 and 102, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this can represent the smallest quantity of resources that currently can be allocated. There are several different physical downlink channels that are conveyed using such resource blocks.

The physical downlink shared channel (PDSCH) can carry user data and higher-layer signaling to the UEs 101 and 102. The physical downlink control channel (PDCCH) can carry information about the transport format and resource allocations related to the PDSCH channel, among other things. It can also inform the UEs 101 and 102 about the transport format, resource allocation, and H-ARQ (Hybrid Automatic Repeat Request) information related to the uplink shared channel. Typically, downlink scheduling (assigning control and shared channel resource blocks to the UE 102 within a cell) can be performed at any of the RAN nodes 111 and 112 based on channel quality information fed back from any of the UEs 101 and 102. The downlink resource assignment information can be sent on the PDCCH used for (e.g., assigned to) each of the UEs 101 and 102.

The PDCCH can use control channel elements (CCEs) to convey the control information. Before being mapped to resource elements, the PDCCH complex-valued symbols can first be organized into quadruplets, which can then be permuted using a sub-block interleaver for rate matching. Each PDCCH can be transmitted using one or more of these CCEs, where each CCE can correspond to nine sets of four physical resource elements known as resource element groups (REGs). Four Quadrature Phase Shift Keying (QPSK) symbols can be mapped to each REG. The PDCCH can be transmitted using one or more CCEs, depending on the size of the downlink control information (DCI) and the channel condition. There can be four or more different PDCCH formats defined in LTE with different numbers of CCEs (e.g., aggregation level, L=1, 2, 4, or 8).

Some embodiments can use concepts for resource allocation for control channel information that are an extension of the above-described concepts. For example, some embodiments can utilize an enhanced physical downlink control channel (EPDCCH) that uses PDSCH resources for control information transmission. The EPDCCH can be transmitted using one or more enhanced the control channel elements (ECCEs). Similar to above, each ECCE can correspond to nine sets of four physical resource elements known as an enhanced resource element groups (EREGs). An ECCE can have other numbers of EREGs in some situations.

The RAN 110 is shown to be communicatively coupled to a core network (CN) 120—via an S1 interface 113. In embodiments, the CN 120 can be an evolved packet core (EPC) network, a NextGen Packet Core (NPC) network, or some other type of CN. In this embodiment the S1 interface 113 is split into two parts: the S1-U interface 114, which carries traffic data between the RAN nodes 111 and 112 and the serving gateway (S-GW) 122, and the S1-mobility management entity (MME) interface 115, which is a signaling interface between the RAN nodes 111 and 112 and MMEs 121.

In this embodiment, the CN 120 comprises the MMEs 121, the S-GW 122, the Packet Data Network (PDN) Gateway (P-GW) 123, and a home subscriber server (HSS) 124. The MMEs 121 can be similar in function to the control plane of legacy Serving General Packet Radio Service (GPRS) Support Nodes (SGSN). The MMEs 121 can manage mobility aspects in access such as gateway selection and tracking area list management. The HSS 124 can comprise a database for network users, including subscription-related information to support the network entities' handling of communication sessions. The CN 120 can comprise one or several HSSs 124, depending on the number of mobile subscribers, on the capacity of the equipment, on the organization of the network, etc. For example, the HSS 124 can provide support for routing/roaming, authentication, authorization, naming/addressing resolution, location dependencies, etc.

The S-GW 122 can terminate the S1 interface 113 towards the RAN 110, and routes data packets between the RAN 110 and the CN 120. In addition, the S-GW 122 can be a local mobility anchor point for inter-RAN node handovers and also can provide an anchor for inter-3GPP mobility. Other responsibilities can include lawful intercept, charging, and some policy enforcement.

The P-GW 123 can terminate an SGi interface toward a PDN. The P-GW 123 can route data packets between the CN network 120 and external networks such as a network including the application server 130 (alternatively referred to as application function (AF)) via an Internet Protocol (IP) interface 125. Generally, the application server 130 can be an element offering applications that use IP bearer resources with the core network (e.g., UMTS Packet Services (PS) domain, LTE PS data services, etc.). In this embodiment, the P-GW 123 is shown to be communicatively coupled to an application server 130 via an IP communications interface 125. The application server 130 can also be configured to support one or more communication services (e.g., Voice-over-Internet Protocol (VoIP) sessions, PTT sessions, group communication sessions, social networking services, etc.) for the UEs 101 and 102 via the CN 120.

The P-GW 123 can further be a node for policy enforcement and charging data collection. Policy and Charging Enforcement Function (PCRF) 126 is the policy and charging control element of the CN 120. In a non-roaming scenario, there can be a single PCRF in the Home Public Land Mobile Network (HPLMN) associated with a UE's Internet Protocol Connectivity Access Network (IP-CAN) session. In a roaming scenario with local breakout of traffic, there can be two PCRFs associated with a UE's IP-CAN session: a Home PCRF (H-PCRF) within a HPLMN and a Visited PCRF (V-PCRF) within a Visited Public Land Mobile Network (VPLMN). The PCRF 126 can be communicatively coupled to the application server 130 via the P-GW 123. The application server 130 can signal the PCRF 126 to indicate a new service flow and select the appropriate Quality of Service (QoS) and charging parameters. The PCRF 126 can provision this rule into a Policy and Charging Enforcement Function (PCEF) (not shown) with the appropriate traffic flow template (TFT) and QoS class of identifier (QCI), which commences the QoS and charging as specified by the application server 130.

In one or more embodiments, IMS services can be identified more accurately in a paging indication, which can enable the UEs 101, 102 to differentiate between PS paging and IMS service related paging. As a result, the UEs 101, 102 can apply preferential prioritization for IMS services as desired based on any number of requests by any application, background searching (e.g., PLMN searching or the like), process, or communication. In particular, the UEs 101, 102 can differentiate the PS domain paging to more distinguishable categories, so that IMS services can be identified clearly in the UEs 101, 102 in comparison to PS services. In addition to a domain indicator (e.g., PS or CS), a network (e.g., CN 120, RAN 110, AP 106, or combination thereof as an eNB or the other network device) can provide further, more specific information with the TS 36.331-Paging message, such as a "paging cause" parameter. The UE can use this information to decide whether to respond to the paging, possibly interrupting some other procedure like an ongoing PLMN search.

In one example, when UEs 101, 102 can be registered to a visited PLMN (VPLMN) and performing PLMN search (i.e., background scan for a home PLMN (HPLMN) or a higher priority PLMN), or when a registered UE is performing a manual PLMN search, the PLMN search can be interrupted in order to move to a connected mode and respond to a paging operation as part of a MT procedure/operation. Frequently, this paging could be for PS data (non-IMS data), where, for example, an application server 130 in the NW wants to push to the UE 101 or 102 for one of the many different applications running in/on the UE 101 or 102, for example. Even though the PS data could be delay tolerant and less important, in legacy networks the paging is often not able to be ignored completely, as critical services like an IMS call can be the reason for the PS paging. The multiple interruptions of the PLMN search caused by the paging can result in an unpredictable delay of the PLMN search or in the worst case even in a failure of the procedure, resulting in a loss of efficiency in network communication operations. A delay in moving to or handover to a preferred PLMN (via manual PLMN search or HPLMN search) in a roaming condition can incur more roaming charges on a user as well.

Figure 2:
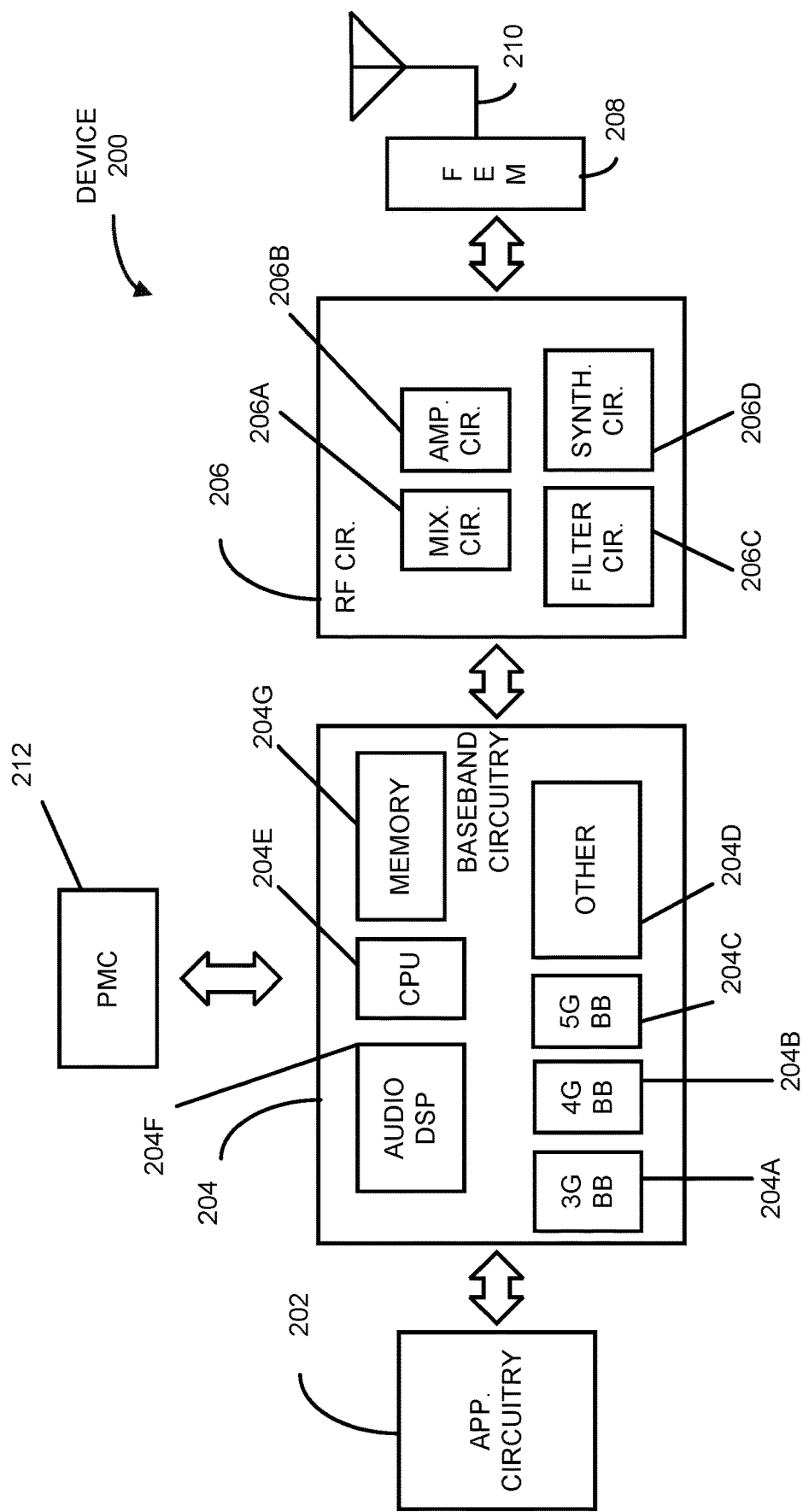
FIG. 2 illustrates another block diagram of an example of wireless communications network environment for a network device (e.g., a UE, gNB or an eNB) according to various aspects or embodiments.

FIG. 2 illustrates example components of a network device 200 in accordance with some embodiments. In some embodiments, the device 200 can include application circuitry 202, baseband circuitry 204, Radio Frequency (RF) circuitry 206, front-end module (FEM) circuitry 208, one or more antennas 210, and power management circuitry (PMC) 212 coupled together at least as shown. The components of the illustrated device 200 can be included in a UE 101, 102 or a RAN node 111, 112, AP, AN, eNB or other network component. In some embodiments, the device 200 can include less elements (e.g., a RAN node can not utilize application circuitry 202, and instead include a processor/controller to process IP data received from an EPC). In some embodiments, the network device 200 can include additional elements such as, for example, memory/storage, display, camera, sensor, or input/output (I/O) interface. In other embodiments, the components described below can be included in more than one device (e.g., said circuitries can be separately included in more than one device for Cloud-RAN (C-RAN) implementations).

The application circuitry 202 can include one or more application processors. For example, the application circuitry 202 can include circuitry such as, but not limited to, one or more single-core or multi-core processors. The processor(s) can include any combination of general-purpose processors and dedicated processors (e.g., graphics processors, application processors, etc.). The processors can be coupled with or can include memory/storage and can be configured to execute instructions stored in the memory/storage to enable various applications or operating systems to run on the device 200. In some embodiments, processors of application circuitry 202 can process IP data packets received from an EPC.

The baseband circuitry 204 can include circuitry such as, but not limited to, one or more single-core or multi-core processors. The baseband circuitry 204 can include one or more baseband processors or control logic to process baseband signals received from a receive signal path of the RF circuitry 206 and to generate baseband signals for a transmit signal path of the RF circuitry 206. Baseband processing circuitry 204 can interface with the application circuitry 202 for generation and processing of the baseband signals and for controlling operations of the RF circuitry 206. For example, in some embodiments, the baseband circuitry 204 can include a third generation (3G) baseband processor 204A, a fourth generation (4G) baseband processor 204B, a fifth generation (5G) baseband processor 204C, or other baseband processor(s) 204D for other existing generations, generations in development or to be developed in the future (e.g., second generation (2G), si2h generation (6G), etc.). The baseband circuitry 204 (e.g., one or more of baseband processors 204A-D) can handle various radio control functions that enable communication with one or more radio networks via the RF circuitry 206. In other embodiments, some or all of the functionality of baseband processors 204A-D can be included in modules stored in the memory 204G and executed via a Central Processing Unit (CPU) 204E. The radio control functions can include, but are not limited to, signal modulation/demodulation, encoding/decoding, radio frequency shifting, etc. In some embodiments, modulation/demodulation circuitry of the baseband circuitry 204 can include Fast-Fourier Transform (FFT), precoding, or constellation mapping/demapping functionality. In some embodiments, encoding/decoding circuitry of the baseband circuitry 204 can include convolution, tail-biting convolution, turbo, Viterbi, or Low Density Parity Check (LDPC) encoder/decoder functionality. Embodiments of modulation/demodulation and encoder/decoder functionality are not limited to these examples and can include other suitable functionality in other embodiments.

In some embodiments, the baseband circuitry 204 can include one or more audio digital signal processor(s) (DSP) 204F. The audio DSP(s) 204F can be include elements for compression/decompression and echo cancellation and can include other suitable processing elements in other embodiments. Components of the baseband circuitry can be suitably combined in a single chip, a single chipset, or disposed on a same circuit board in some embodiments. In some embodiments, some or all of the constituent components of the baseband circuitry 204 and the application circuitry 202 can be implemented together such as, for example, on a system on a chip (SOC).

In some embodiments, the baseband circuitry 204 can provide for communication compatible with one or more radio technologies. For example, in some embodiments, the baseband circuitry 204 can support communication with an evolved universal terrestrial radio access network (EU-TRAN) or other wireless metropolitan area networks (WMAN), a wireless local area network (WLAN), a wireless personal area network (WPAN). Embodiments in which the baseband circuitry 204 is configured to support radio communications of more than one wireless protocol can be referred to as multi-mode baseband circuitry.

RF circuitry 206 can enable communication with wireless networks using modulated electromagnetic radiation through a non-solid medium. In various embodiments, the RF circuitry 206 can include switches, filters, amplifiers, etc. to facilitate the communication with the wireless network. RF circuitry 206 can include a receive signal path which can include circuitry to down-convert RF signals received from the FEM circuitry 208 and provide baseband signals to the baseband circuitry 204. RF circuitry 206 can also include a transmit signal path which can include circuitry to up-convert baseband signals provided by the baseband circuitry 204 and provide RF output signals to the FEM circuitry 208 for transmission.

In some embodiments, the receive signal path of the RF circuitry 206 can include mixer circuitry 206a, amplifier circuitry 206b and filter circuitry 206c. In some embodiments, the transmit signal path of the RF circuitry 206 can include filter circuitry 206c and mixer circuitry 206a. RF circuitry 206 can also include synthesizer circuitry 206d for synthesizing a frequency for use by the mixer circuitry 206a of the receive signal path and the transmit signal path. In some embodiments, the mixer circuitry 206a of the receive signal path can be configured to down-convert RF signals received from the FEM circuitry 208 based on the synthesized frequency provided by synthesizer circuitry 206d. The amplifier circuitry 206b can be configured to amplify the down-converted signals and the filter circuitry 206c can be a low-pass filter (LPF) or band-pass filter (BPF) configured to remove unwanted signals from the down-converted signals to generate output baseband signals. Output baseband signals can be provided to the baseband circuitry 204 for further processing. In some embodiments, the output baseband signals can be zero-frequency baseband signals, although this is not a requirement. In some embodiments, mixer circuitry 206a of the receive signal path can comprise passive mixers, although the scope of the embodiments is not limited in this respect.

In some embodiments, the mixer circuitry 206a of the transmit signal path can be configured to up-convert input baseband signals based on the synthesized frequency provided by the synthesizer circuitry 206d to generate RF output signals for the FEM circuitry 208. The baseband signals can be provided by the baseband circuitry 204 and can be filtered by filter circuitry 206c.

In some embodiments, the mixer circuitry 206a of the receive signal path and the mixer circuitry 206a of the transmit signal path can include two or more mixers and can be arranged for quadrature downconversion and upconversion, respectively. In some embodiments, the mixer circuitry 206a of the receive signal path and the mixer circuitry 206a of the transmit signal path can include two or more mixers and can be arranged for image rejection (e.g., Hartley image rejection). In some embodiments, the mixer circuitry 206a of the receive signal path and the mixer circuitry 206a can be arranged for direct downconversion and direct upconversion, respectively. In some embodiments, the mixer circuitry 206a of the receive signal path and the mixer circuitry 206a of the transmit signal path can be configured for super-heterodyne operation.

In some embodiments, the output baseband signals and the input baseband signals can be analog baseband signals, although the scope of the embodiments is not limited in this respect. In some alternate embodiments, the output baseband signals and the input baseband signals can be digital baseband signals. In these alternate embodiments, the RF circuitry 206 can include analog-to-digital converter (ADC) and digital-to-analog converter (DAC) circuitry and the baseband circuitry 204 can include a digital baseband interface to communicate with the RF circuitry 206.

In some dual-mode embodiments, a separate radio IC circuitry can be provided for processing signals for each spectrum, although the scope of the embodiments is not limited in this respect.

In some embodiments, the synthesizer circuitry 206d can be a fractional-N synthesizer or a fractional N/N+1 synthesizer, although the scope of the embodiments is not limited in this respect as other types of frequency synthesizers can be suitable. For example, synthesizer circuitry 206d can be a delta-sigma synthesizer, a frequency multiplier, or a synthesizer comprising a phase-locked loop with a frequency divider.

The synthesizer circuitry 206d can be configured to synthesize an output frequency for use by the mixer circuitry 206a of the RF circuitry 206 based on a frequency input and a divider control input. In some embodiments, the synthesizer circuitry 206d can be a fractional N/N+1 synthesizer.

In some embodiments, frequency input can be provided by a voltage controlled oscillator (VCO), although that is not a requirement. Divider control input can be provided by either the baseband circuitry 204 or the applications processor 202 depending on the desired output frequency. In some embodiments, a divider control input (e.g., N) can be determined from a look-up table based on a channel indicated by the applications processor 202.

Synthesizer circuitry 206d of the RF circuitry 206 can include a divider, a delay-locked loop (DLL), a multiplexer and a phase accumulator. In some embodiments, the divider can be a dual modulus divider (DMD) and the phase accumulator can be a digital phase accumulator (DPA). In some embodiments, the DMD can be configured to divide the input signal by either N or N+1 (e.g., based on a carry out) to provide a fractional division ratio. In some example embodiments, the DLL can include a set of cascaded, tunable, delay elements, a phase detector, a charge pump and a D-type flip-flop. In these embodiments, the delay elements can be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 206d can be configured to generate a carrier frequency as the output frequency, while in other embodiments, the output frequency can be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency can be a LO frequency (fLO). In some embodiments, the RF circuitry 206 can include an IQ/polar converter.

FEM circuitry 208 can include a receive signal path which can include circuitry configured to operate on RF signals received from one or more antennas 210, amplify the received signals and provide the amplified versions of the received signals to the RF circuitry 206 for further processing. FEM circuitry 208 can also include a transmit signal path which can include circuitry configured to amplify signals for transmission provided by the RF circuitry 206 for transmission by one or more of the one or more antennas 210. In various embodiments, the amplification through the transmit or receive signal paths can be done solely in the RF circuitry 206, solely in the FEM 208, or in both the RF circuitry 206 and the FEM 208.

In some embodiments, the FEM circuitry 208 can include a TX/RX switch to switch between transmit mode and receive mode operation. The FEM circuitry can include a receive signal path and a transmit signal path. The receive signal path of the FEM circuitry can include an LNA to amplify received RF signals and provide the amplified received RF signals as an output (e.g., to the RF circuitry 206). The transmit signal path of the FEM circuitry 208 can include a power amplifier (PA) to amplify input RF signals (e.g., provided by RF circuitry 206), and one or more filters to generate RF signals for subsequent transmission (e.g., by one or more of the one or more antennas 210).

In some embodiments, the PMC 212 can manage power provided to the baseband circuitry 204. In particular, the PMC 212 can control power-source selection, voltage scaling, battery charging, or DC-to-DC conversion. The PMC 212 can often be included when the device 200 is capable of being powered by a battery, for example, when the device is included in a UE. The PMC 212 can increase the power conversion efficiency while providing desirable implementation size and heat dissipation characteristics.

While FIG. 2 shows the PMC 212 coupled only with the baseband circuitry 204. However, in other embodiments, the PMC 2 12 can be additionally or alternatively coupled with, and perform similar power management operations for, other components such as, but not limited to, application circuitry 202, RF circuitry 206, or FEM 208.

In some embodiments, the PMC 212 can control, or otherwise be part of, various power saving mechanisms of the device 200. For example, if the device 200 is in an RRC_Connected state, where it is still connected to the RAN node as it expects to receive traffic shortly, then it can enter a state known as Discontinuous Reception Mode (DRX) after a period of inactivity. During this state, the device 200 can power down for brief intervals of time and thus save power.

If there is no data traffic activity for an extended period of time, then the device 200 can transition off to an RRC_Idle state, where it disconnects from the network and does not perform operations such as channel quality feedback, handover, etc. The device 200 goes into a very low power state and it performs paging where again it periodically wakes up to listen to the network and then powers down again. The device 200 does not receive data in this state, in order to receive data, it transitions back to RRC_Connected state.

An additional power saving mode can allow a device to be unavailable to the network for periods longer than a paging interval (ranging from seconds to a few hours). During this time, the device can be unreachable to the network and can power down completely. Any data sent during this time can incur a large delay with the delay presumed to be acceptable.

Processors of the application circuitry 202 and processors of the baseband circuitry 204 can be used to execute elements of one or more instances of a protocol stack. For example, processors of the baseband circuitry 204, alone or in combination, can be used execute Layer 3, Layer 2, or Layer 1 functionality, while processors of the application circuitry 204 can utilize data (e.g., packet data) received from these layers and further execute Layer 4 functionality (e.g., transmission communication protocol (TCP) and user datagram protocol (UDP) layers). As referred to herein, Layer 3 can comprise a radio resource control (RRC) layer, described in further detail below. As referred to herein, Layer 2 can comprise a medium access control (MAC) layer, a radio link control (RLC) layer, and a packet data convergence protocol (PDCP) layer, described in further detail below. As referred to herein, Layer 1 can comprise a physical (PHY) layer of a UE/RAN node. Each of these layers can be implemented to operate one or more processes or network operations of embodiments/aspects herein.

In addition, the memory 204G can comprise one or more machine-readable medium/media including instructions that, when performed by a machine or component herein cause the machine to perform acts of the method or of an apparatus or system for concurrent communication using multiple communication technologies according to embodiments and examples described herein. It is to be understood that aspects described herein can be implemented by hardware, software, firmware, or any combination thereof. When implemented in software, functions can be stored on or transmitted over as one or more instructions or code on a computer-readable medium (e.g., the memory described herein or other storage device). Computer-readable media includes both computer storage media and communication media including any medium that facilitates transfer of a computer program from one place to another. A storage media or a computer readable storage device can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or other tangible and/or non-transitory medium, that can be used to carry or store desired information or executable instructions. Also, any connection can also be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then coaxial cable, fiber optic cable, twisted pair, DSL, or wireless technologies such as infrared, radio, and microwave are included in the definition of medium.

In general, there is a move to provide network services for the packet domain. The earlier network services like UMTS or 3G and predecessors (2G) configured a CS domain and a packet domain providing different services, especially CS services in the CS domain as well as voice services were considered to have a higher priority because consumers demanded an immediate response. Based on the domain that the paging was received, the device 200 could assign certain priority for the incoming transaction. Now with LTE/5G most services are moving to the packet domain. Currently, the UE (e.g., 101, 102, or device 200) can get paging for a packet service without knowing any further information about the paging of the MT procedure, such as whether someone is calling on a line, a VoIP call, or just some packet utilized from Facebook, other application service, or other similar MT service. As such, a greater opportunity exists for further delays without the possibility for the UE to discriminate between the different application packets that could initiate a paging and also give a different priority to it based on one or more user preferences. This can could be important for the UE because the UE might be doing other tasks more vital for resource allocation.

In one example, a UE (e.g., 101, 102, or device 200) could be performing a background search for other PLMNs. This is a task the UE device 200 could do in regular intervals if it is not connected on its own home PLMN or a higher priority PLMN, but roaming somewhere else. A higher priority could be a home PLMN or some other PLMNs according to a list provided by the provider or subscriber (e.g., HSS 124). Consequently, if a paging operation arrives as an MT service and an interruption results, such that a start and begin operation are executed, a sufficient frequency of these interruptions could cause the UE to never complete a background search in a reasonable way. This is one way where it would be advantageous for the UE or network device to know that the interruption is only a packet service, with no need to react to it immediately, versus an incoming voice call that takes preference immediately and the background scan should be postponed.

Additionally, the device 200 can be configured to connect or include multiple subscriber identity/identification module (SIM) cards/components, referred to as dual SIM or multi SIM devices. The device 200 can operate with a single transmit and receive component that can coordinate between the different identities from which the SIM components are operating. As such, an incoming voice call should be responded to as fast as possible, while only an incoming packet for an application could be relatively ignored in order to utilize resources for the other identity (e.g., the voice call or SIM component) that is more important or has a higher priority from a priority list/data set/or set of user device preferences, for example. This same scenario can also be utilized for other operations or incoming data, such as with a PLMN background search such as a manual PLMN search, which can last for a long period of time since, especially with a large number of different bands from 2G, etc. With an ever increasing number of bands being utilized in wireless communications, if paging interruptions come in between the operations already running without distinguishing between the various packet and real critical services such as voice, the network devices can interpret this manual PLMN search to serve and ensure against a drop or loss of any increment voice call, with more frequent interruptions in particular.

As stated above, even though in most of these cases the PS data is delay tolerant and less important, in legacy networks the paging cannot be ignored completely, as critical services like an IMS call can be the reason for the PS paging. The multiple interruptions of a PLMN search caused by the paging can result in an unpredictable delay of the PLMN search or in the worst case even in a failure of the procedure. Additionally, a delay in moving to preferred PLMN (via manual PLMN search or HPLMN search) in roaming condition can incur more roaming charges on user. Similarly, in multi-SIM scenario when UE is listening to paging channel of two networks simultaneously and has priority for voice service, a MT IMS voice call can be interpreted as "data" call as indicated in MT paging message and can be preceded by MT Circuit Switched (CS) paging of an other network or MO CS call initiated by user at same time. As such, embodiments/aspects herein can increase the call drop risk significantly for the SIM using IMS voice service.

In embodiments, 3GPP NW can provide further granular information about the kind of service the network is paging for. For example, the Paging cause parameter could indicate one of the following values/classes/categories: 1) IMS voice/video service; 2) IMS SMS service; 3) IMS other services (not voice/video/SMS-related; 4) any IMS service; 5) Other PS service (not IMS-related). In particular, a network device (e.g., an eNB or access point) could only be discriminating between IMS and non-IMS services could use 4) and 5), whereas a network that is able to discriminate between different types of IMS services (like voice/video call, SMS, messaging, etc.) could use 3) instead of 4) to explicitly indicate to the UE that the paging is for an IMS service different from voice/video and SMS. By obtaining this information UE may decide to suspend PLMN search only for critical services like incoming voice/video services.

In other aspects, dependent on the service category (e.g., values or classes 1-5 above), the UE 101, 102, or device 200 can memorize that there was a paging to which it did not respond, and access the network later, when the PLMN search has been completed and the UE decides to stay on the current PLMN. For example, if the reason for the paging was a mobile terminating IMS SMS, the MME can then inform the HSS (e.g., 124) that the UE is reachable again, and the HSS 124 can initiate a signaling procedure which will result in a delivery of the SMS to the UE once resources are more available or less urgent for another operation/application/or category, for example. To this purpose the UE 101, 102, or 200 could initiate a periodic tau area update (TAU) procedure if the service category in the Paging message indicated "IMS SMS service", for example.

Figure 3:
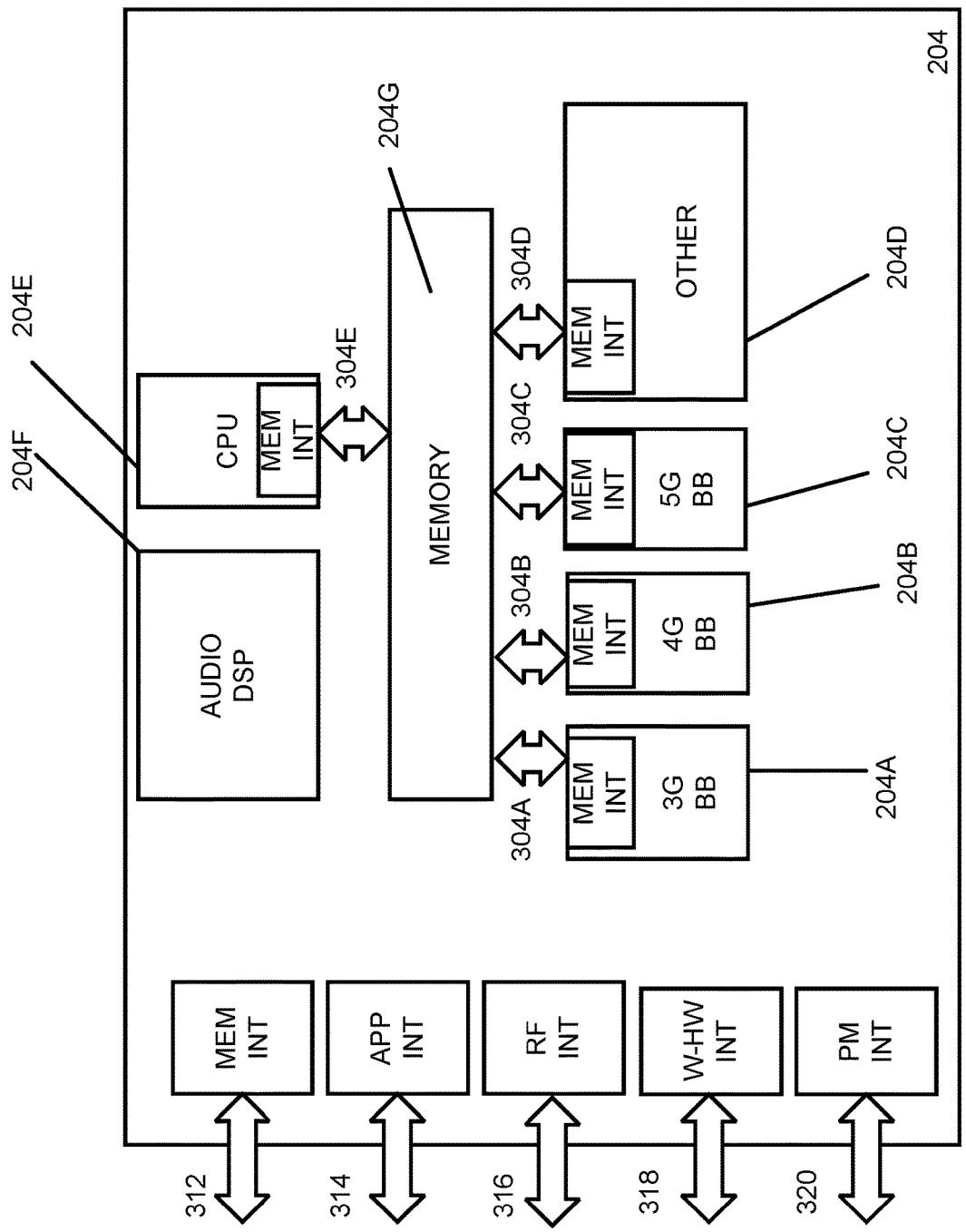
FIG. 3 another block diagram of an example of wireless communications network environment for network device (e.g., a UE, gNB or an eNB) with various interfaces according to various aspects or embodiments.

FIG. 3 illustrates example interfaces of baseband circuitry in accordance with some embodiments. As discussed above, the baseband circuitry 204 of FIG. 2 can comprise processors 204A-204E and a memory 204G utilized by said processors. Each of the processors 204A-204E can include a memory interface, 304A-304E, respectively, to send/receive data to/from the memory 204G.

The baseband circuitry 204 can further include one or more interfaces to communicatively couple to other circuitries/devices, such as a memory interface 312 (e.g., an interface to send/receive data to/from memory external to the baseband circuitry 204), an application circuitry interface 314 (e.g., an interface to send/receive data to/from the application circuitry 202 of FIG. 2), an RF circuitry interface 316 (e.g., an interface to send/receive data to/from RF circuitry 206 of FIG. 2), a wireless hardware connectivity interface 318 (e.g., an interface to send/receive data to/from Near Field Communication (NFC) components, Bluetooth® components (e.g., Bluetooth® Low Energy), Wi-Fi® components, and other communication components), and a power management interface 320 (e.g., an interface to send/receive power or control signals to/from the PMC 212.

Figure 4:
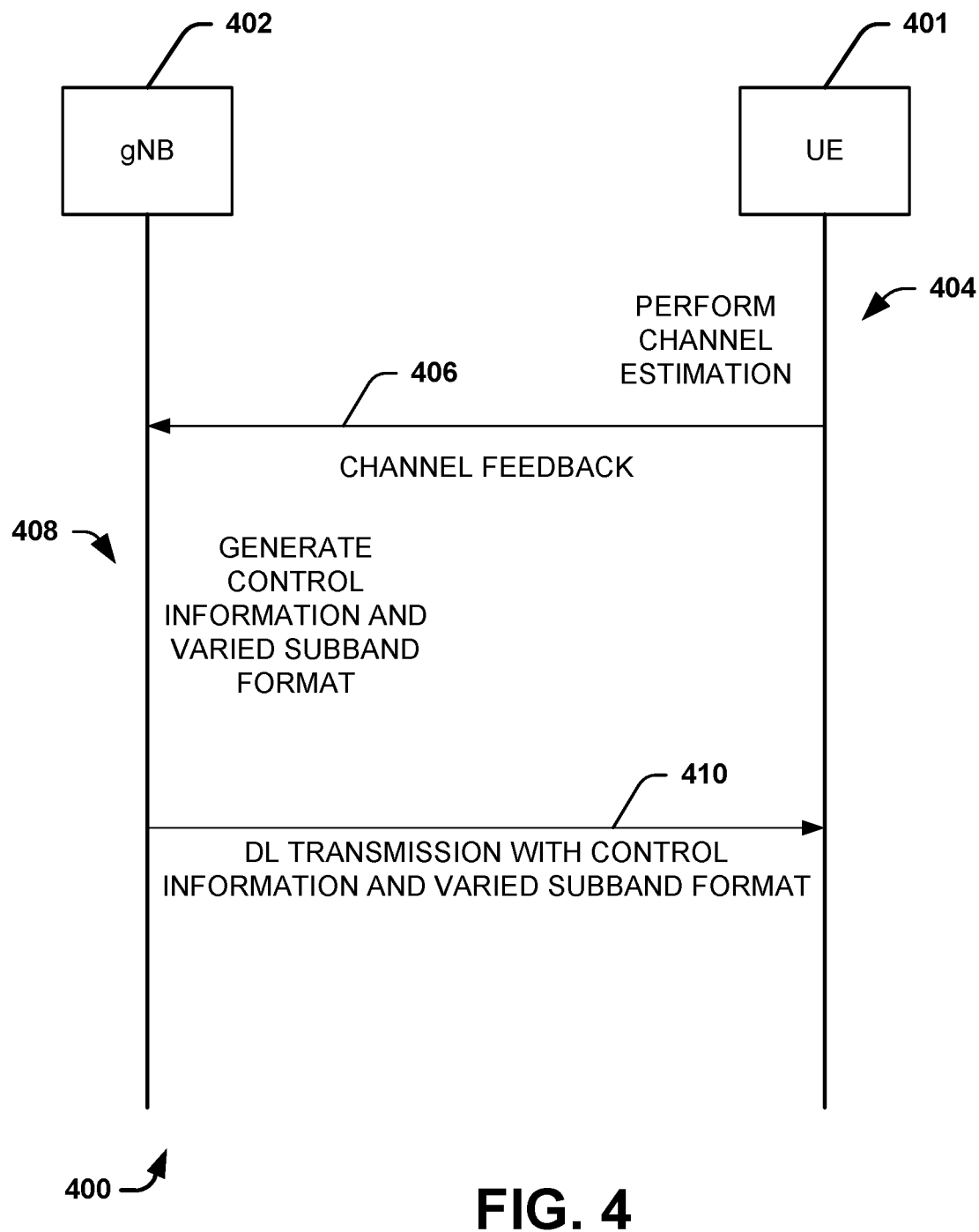
FIG. 4 is a diagram illustrating an architecture of a system for providing control information in varied subbands for mobile communications in accordance with some embodiments.

FIG. 4 is a diagram illustrating an architecture of a system 400 for providing control information in varied subbands for mobile communications in accordance with some embodiments. The system or apparatus 400 can be utilized with the above embodiments and variations thereof, including the system 100 described above. The system 400 is provided as an example and it is appreciated that suitable variations are contemplated.

The system 400 includes a network device 401 and a node 402. The device 401 is shown as a UE device and the node 402 is shown as gNB for illustrative purposes. It is appreciated that the UE device 401 can be other network devices, such as Aps, ANs and the like. It is also appreciated that the gNB 402 can be other nodes or access nodes (ANs), such as BSs, eNB, gNB, RAN nodes and the like. Other network or network devices can be present and interact with the device 401 and/or the node 402. Operation of the device 401 and/or the node 402 can be performed by circuitry, such as the baseband circuitry 204, described above.

Downlink (DL) transmissions occur from the gNB 402 to the UE 401 whereas uplink (UL) transmissions occur from the UE 401 to the gNB 402. The downlink transmissions utilize a DL control channel and a DL data channel. The uplink transmissions utilize an UL control channel and a UL data channel. The various channels can be different in terms of direction, link to another gNB, eNB and the like.

The UE 401 is one of a set or group of UE devices assigned to or associated with a cell of the eNB 402.

The UE 401 performs channel estimation, channel measurements, obtains channel information and/or the like at 404. The UE 401 can utilize reference signals, such as channel state information reference signals (CSI-RS) to perform the channel estimation.

The UE 401 provides channel feedback 406 to the gNB 402 based on the performed channel estimation and the like.

The gNB 402 generates control information for the UE 401 based on the channel feedback and other information. The control information for the UE 401 is also referred to as UE specific control information. The gNB 402 determines data resources for the UE 401 based on the channel feedback, channel information, resource availability, and the like. The data resources for the UE 401 can vary based on types of transmissions (DL or UL), channel availability, resource availability (frequency and time), amount of data, requested data rate for the UE 401, and the like. The data resources can be in the form of resource block (RBs), physical resource blocks (PRBs) and the like.

The gNB 402 determines a control information subband size (frequency resources) and a data subband size for the UE 401. The control subband size can be as large as the data subband size, in one example. In another example, the control subband size is less than or substantially less than the data subband size. Additionally, the gNB 402 determines time resources for the control information for the UE 401 and time resources for the UL/DL data for the UE 401. In one example, the time resources are one symbol or OFDM symbol. In another example, the time resources are two symbols or OFDM symbols. Thus, the gNB 402 assigns time and frequency resources for the control information for the UE 410 based on the channel feedback and other information.

Thus, the control subband and the data subband sizes/bandwidths can be different for a UE device. A data subband size can be at least the control subband size in the frequency domain. A 1 to 1 (1:1) mapping can be defined for the control subband and the corresponding data subband. If the data subband size is larger than the control subband size, resource allocation information can be provided to the UE 401 to indicate the data subband resources.

Another factor utilized by the gNB 402 to determine the control information, control subband size and data subband size is granularity. The granularity is a unit of time and frequency resources. The less resources used, the higher the granularity. In one example of granularity, the granularity is set at 4 resource blocks (RBs) where each RB includes one or more of a time resource and a frequency resource.

The gNB 402 also determines a number of stages of control information to convey the control information to the UE 401. Thus, for example, if a first DCI is not sufficiently large enough to include the resource allocations and/or mappings, additional stages can be used to include the control information. Some examples of identifying and using stages are provided below.

The control information can include resource allocation for the data subband. For example, the resource allocation can identify resources or RBs for the data subband. In another example, the resource allocation is an offset from control subband resources. Thus, the UE 401 determines the resources for the data subband using the offset and the resource location for the control subband.

The gNB 402 can also perform beamforming based on the channel feedback.

The gNB 402 generates a varied subband format or pattern for a channel, also at 408, based on the control information. The gNB 402 uses the determined number of stages, the determined control subband size, the determined data subband size, and the control information for the UE 401 and, optionally, additional UE devices to generate the varied subband format. The format or pattern can also be a frame or one or more subframes.

The gNB 402 transmits the format/pattern at 410 using the channel, where the format includes varied subband sizes. In one example, the channel is or includes a physical channel, such as a physical downlink control channel (PDCCH).

The UE 401 receives the transmission from 410 and uses the control information to identify and use data resources to obtain or send data.

The varied subband format can reduce the DCI payload compared with other approaches by reducing the amount of resource allocation to be signaled. The UE specific control information can be transmitted within the same resource blocks (RBs) as is a scheduled datasubband or the DL control subband.

When the data subband is the same size as the control subband, resource allocation information for the data subband is not required, thus the resource allocation information does not need to be signaled in or provided with the DCI. When the data subband is larger than the control subband (for a given UE), the control subband can carry DCI on resource allocation to schedule the data subband and/or potentially DCI on resource allocation for the overall data subbands assigned for the UE, such as the UE 401, in the slot.

An example situation where a control subband and a data subband for a UE have the same size can correspond to a scenario where the UE is assigned with a relatively small number of PRBs, such as less than or equal to 4 PRBs. It is noted that a PRB in LTE and NR includes that a PRB can use 12 subcarriers over 14 symbols. Not signaling resource allocation information reduces overhead for control information. When the data subband size is larger than the control subband size, the UE may be assigned a relatively large number of PRBs, such as 8 or more PRBs. In this example, the control channel is not resource limited or limiting. The additional resource allocation information can be signaled without causing a substantial or notable increase in control overhead. For UEs with medium sized data subbands (4-8 PRBs), the control subband can be smaller than the data subband. The resource allocation information can be signaled with a reduced size. For example, a PRB location offset with respect to the control subband can be signaled by the gNB 402.

As another example, a carrier bandwidth is 100 resource blocks (RBs). The RBs are grouped into 25 RB groups (RBG), each of size 4 RBs. A resource allocation bitmap can contain 25 bits, with each bit corresponding to one RBG. For this example, a '0' bit indicates that a corresponding RBG is not assigned for a UE device while a '1' bit indicates that the corresponding RBG is assigned for the UE device. A PRB location offset can contain a PRB index with respect to a DL control subband. For the carrier bandwidth of 100 RBs, 9 bits are used to signal the PRB offset. The first 5 bits of the PRB offset indicate an RBG index (for 25 RBGs, 5 bits are used) and the last 4 bits indicate bitmaps for the RBs within the RBG.

For illustrative purposes, various examples are provided. However, it is appreciated that other suitable examples having differing bandwidths, resource blocks, PRBs, PRB offsets and the like are contemplated.

Figure 5:
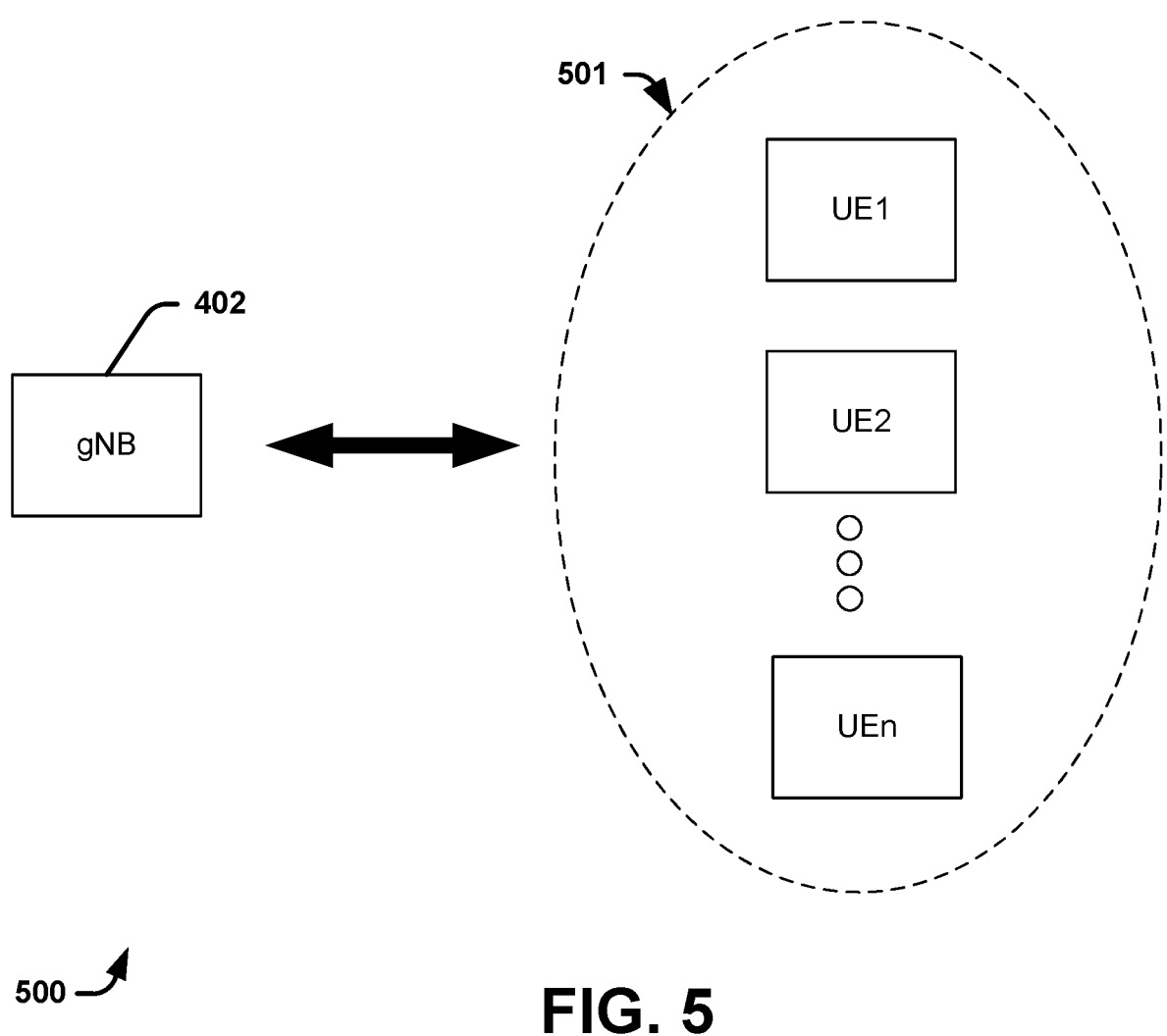
FIG. 5 is a diagram illustrating an architecture of a system for providing control information in accordance with some embodiments.

FIG. 5 is a diagram illustrating an architecture of a system 500 for providing control information in accordance with some embodiments. The system 500 includes functions or operations implemented by baseband circuitry. The system 500 is provided for illustrative purposes and it is appreciated that additional components/elements can be included and/or omitted.

The system 500 can be implemented within a node, such as an eNB, gNB, UE device, network node, and the like for communication or interaction with another node.

A node (gNB) 402 generates a downlink (DL) channel format or pattern for a group or cell of user equipment (UE) devices 501. The group can include a UE device, such as the UE device 401, shown above.

The node 402 can obtain channel information for one or more available channels or bandwidths and requested data bandwidths, data rates, and the like for the group of UE devices 501. The node 402 generates control information for the group of UE devices 501 based on the obtained channel information and the requested data information.

The control information can include resource allocations for data subbands for the group of UE devices 501. The resource allocations can include offset, PRB offsets and the like to indicate the location of resources for the data.

The node 402 generates the channel format having varied subband sizes for the group of UE devices 501 based on the generated control information and, the obtained channel information and the requested data information. The control information is contained within one or more stages. The control information is provided within a downlink control information (DCI).

The node 402 transmits to the UE devices 501 using the varied subband channel format. The UE devices 501 use the control information to identify data resources and use the identified data resources to receive downlink data and/or transmit uplink data.

FIG. 6 is a table illustrating downlink control information (DCI) 600 with various control and data subband sizes in accordance with some embodiments. The information 600 is provided for illustrative purposes and it is appreciated that other suitable content, control subband sizes, data subband sizes and the like are contemplated. The DCI 600 can be used with systems, such as the system 100, 400 and 500 for control information.

A first column shows control subband and data subband sizes while a second column shows associated DCI content and resource mapping.

For illustrative purposes, a base station determines and generates the DCI content and resource mapping for a user equipment (UE) device and other UE devices.

If the data subband size is less than 5 RBs in this example, the resource allocation is not required to be explicitly signaled in the DCI and the data subband has the location of the control subband.

For a first entry, the control and data subbands sizes are relatively small, such as 1 resource block (RB). The number of RBs is less than 5 RBs and explicit signaling of resource allocation is not required. Control information (e.g., DCI) is transmitted in the same RBs assigned for data. A cell radio network temporary identifier (CRNTI) symbol is also provided. The CRNTI can be level scrambled with modulated control data.

For a second entry, the control and data subbands sizes are set at one of 2, 3, or 4 RBs. For this sizing, the control information is also transmitted in the same RBs assigned for data. Explicit signaling of resource allocation is not required.

For a third entry, sizing of the data subbands is set at 5 RBs. The control information includes mapping 20 bits for resource allocation/assignment, 5 bits for antenna ports allocation/assignment, 2 bits for DMRS cyclic shift for an uplink slot and 16 bits for cyclic redundancy check (CRC). As shown above, when/if the data subband is larger than the control subband, resource allocation for the data subband is typically included with the control information and the DCI.

Figure 7:
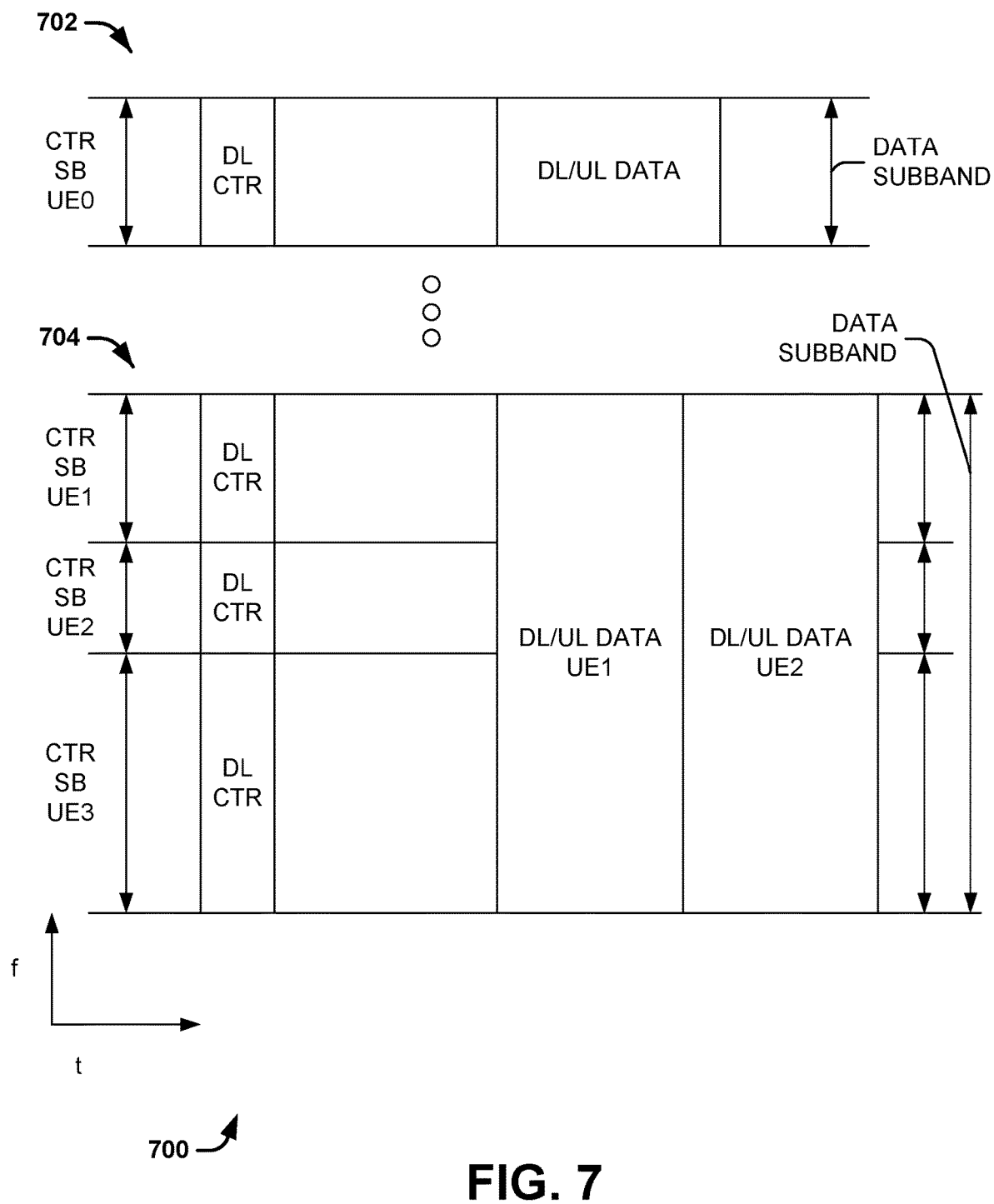
FIG. 7 is a diagram illustrating downlink channel formats in accordance with one or more embodiments.

FIG. 7 is a diagram illustrating downlink channel formats 700 in accordance with one or more embodiments. The formats 700 are provided for illustrative purposes and it is appreciated that suitable variations are contemplated. The channel formats 700 provide control information for various user equipment (UE) devices.

Time (t) resources are shown along an x-axis (horizontal) and frequency (f) resources are shown along a y-axis (vertical).

A first format/pattern 702 for a channel is for a UE0 device, shown in FIG. 7 as UE0. Here, it can be seen that a physical downlink control subband (DL CTR) and a physical data subband (shown as DL/UL DATA) have the same size in a frequency domain, also referred to as the subband size. Here, the DCI in the DL CTR only contains information for the UE0 and a modulation and coding scheme (MCS) for the UE0. The DCI in the DL CTR for the UE0 does not need to include resource allocation information for the data subband DL/UL DATA.

A second format 704 for a channel is for multiple UE devices in the same DCI or data subband. The second format 704 includes control information for UE1, UE2 and UE3, in this example. The physical data subband is greater than each of the individual control subbands. The UE1 has a physical downlink control subband (CTR SB UE1) that is less than the physical data subband. Further, the UE2 has a physical downlink control subband (CTR SB UE2) that is also less than the physical data subband. The UE3 has a physical downlink control subband (CTR SB UE3) that is less than the physical data subband.

Resource allocation or mapping information is provided in the DCI, shown as DL CTR. The resource allocation for the UE1 is provided within its subband CTR SB UE1. The data (DL/UL DATA UE1) is provided on the allocated resources for the UE1 and includes the all the control subbands as shown, which is the full bandwidth or frequency resources for the format/channel 704.

The resource allocation for the UE2 is provided within its subband CTR SB UE2. The data (DL/UL DATA UE2) is provided on the allocated resources for the UE2 and includes the all the control subbands as shown, which is the full bandwidth or frequency resources for the format/channel 704. The UE2 control subband has a smaller size than the subband for the UE1.

The resource allocation for the UE3 is provided within its subband CTR SB UE3. The data (DL/UL DATA UE3) is provided on the allocated resources for the UE3 and includes the all the control subbands as shown, which is the full bandwidth or frequency resources for the format/channel 704. The UE3 control subband has a larger size than the subbands for the UE1 and the UE2.

Thus, the second format 704 includes physical data subbands that occupy the full frequency resources for UEs while DCI is provided within subbands of varying lengths smaller than the full frequency resources.

It is appreciated that other suitable formats having varied subband sizes and/or varied numbers of associated UE devices are contemplated.

Figure 8:
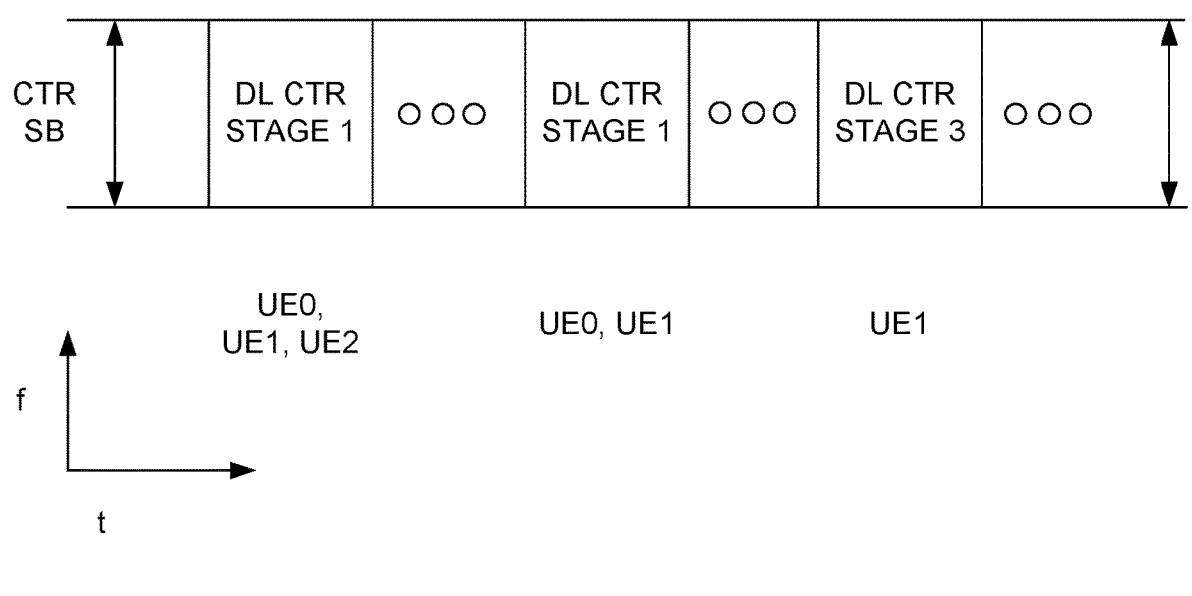
FIG. 8 is a diagram illustrating a channel format using multiple stages for control information in accordance with one or more embodiments.

FIG. 8 is a diagram illustrating a channel format 800 using multiple stages for control information in accordance with one or more embodiments. The multiple stages provide allocation of resources for data that can vary for individual user equipment (UE) devices. The format 800 is provided for illustrative purposes and it is appreciated that suitable variations are contemplated, including varied numbers of stages and/or UE devices.

Time (t) resources are shown along an x-axis (horizontal) and frequency (f) resources are shown along a y-axis (vertical).

The format 800 depicts a channel with an overall control subband size shown with three stages, in this example.

A first stage (DL CTR STAGE 1) includes first stage control information for UE devices UE0, UE1, and UE 2. The first stage control information includes resource allocation for all the UE devices. The first stage control information is segmented into subbands for each of the UE devices, such as shown above with format 704. The UE devices can have varied data requirements, thus the amount of control information for the UE devices is also varied.

In this example, the UE2 has lower data requirements and data resource requirements. The UE1 has the largest data requirements and the UE0 has data requirements between the UE2 and the UE1.

Thus, the first stage control information includes all the resource allocation for UE2 data to identify resources for UL and DL data. However, there are not sufficient control resources for the UE0 and UE1 in the first stage control information.

A second stage control information is used to provide additional control resources for control information related to the UE0 and the UE1. Here, the second stage in conjunction with the first stage provides suitable control resources to identify/allocate data resources for the UE0. However, there are not enough control resources to provide and/or identify data resources for the UE1.

A third stage control information provides additional control resources for the UE1. The third, second and first stages thus include sufficient control resources to identify/allocate data resources for the UE1.

It is noted that the UEs can receive data prior to other stages. For example, the UE2 can have and use data resources prior to the second stage control information because the UE2 has the identified resources after the first stage. Similarly, the UE0 can use data resources prior to the third stage control information because the UE0 has the identified data resources after the second stage control information.

In operation, the number of control information stages can vary. For example, there can be more or less than the three stages provided in this example.

Figure 9:
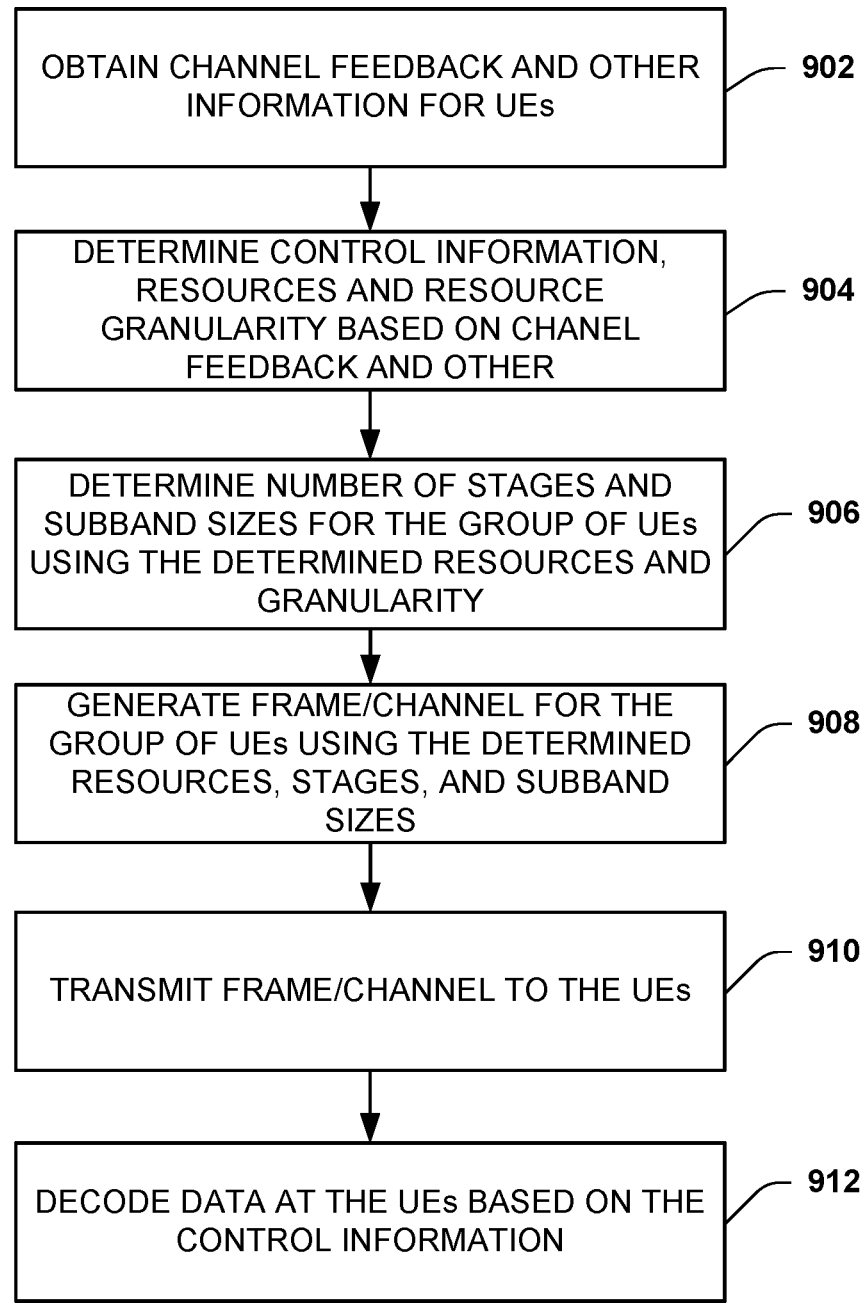
FIG. 9 is a flow diagram illustrating a method using varied subband sizes for downlink/uplink control information in accordance with some embodiments.

FIG. 9 is a flow diagram illustrating a method 900 using varied subband sizes for downlink/uplink control information in accordance with some embodiments. The method 900 facilitates communication and resource allocation for one or more user equipment (UE) devices or nodes. The nodes can be associated with a cell and a base station or other node.

The method or process 900 is described with reference to a UE device and a node (gNB), however it is appreciated that other device and/or nodes can be used. For example, the node can be other types of nodes, such as an eNB, gNB and the like. The method 900 can be implemented using the above systems, arrangements, circuitry and variations thereof. In one example, the method or process 900 is performed by baseband circuitry 204.

The gNB obtains channel information and other information for a group of UE devices at block 902. The channel information can include channel estimation performed and/or obtained by the set of UE devices. The other information can include requested data rates, requested data bandwidths, and the like.

The gNB generates control information for the set of UE devices at block 904. The control information can identify and/or allocate UL and/or DL data resources for the group of UE devices. The control information is also based on available resources, resource granularity, and the like.

In one example, the resource allocation is an offset from control subband resource locations. The offset can be specified in terms of resource blocks (RBs), physical resource blocks (PRBs) and the like. The offset can be in terms of time and/or frequency.

In another example, resource blocks (RBs) are arranged in groups of resource blocks, referred to as resource block groups (RBGs). RBs can be allocated based on an index to a RBG followed by a location within the RBG. An example of RBG allocation is provided above.

The gNB determines a number of control information stages and subband sizes for the group of UEs at block 906. The number of stages can be based on an amount of data resources that need to be identified or allocated, a size of the control subband and the like.

The gNB generates a channel format or frame for the group of UEs using the determined control information stages, subband sizes and the control information at 908. An example of a suitable channel format is shown in FIG. 7 at 704. However, It is appreciated that other channels and variations thereof are contemplated.

The varied subband sizes channel is transmitted at block 910 to the group of UEs. The location of the control information for the UEs can be pre-determined or provided by signaling. In one example, one or more symbols are pre designated to include control information.

The UEs determine data resources from the contained control information and use the determined data resources to transmit uplink data and/or receive downlink data at block 912. The group of UEs uses the location of the control information to identify and obtain control information specific to each UE. The UEs can obtain data resource location or data subband location information from the UE specific control information.

In one example, UE specific data resource allocation is specified in terms of an offset from the control subband. For example, the data subband for UE1 can be an offset of a first number of symbols and the data subband for UE2 can be an offset of a second number of symbols, where the second number is greater than the first number.

The control information for a UE can also indicate that multiple stages are used for additional control information, including data resource allocation and/or additional data resource allocation.

If the data subband for a UE is the same size or less than the control subband for the UE, the control information for the UE can omit resource allocation for the UE, as described above.

The method 900 can be repeated and/or re-utilized for additional channels, additional data and the like. It is appreciated that suitable variations of the method 900 are contemplated.

While the methods described within this disclosure are illustrated in and described herein as a series of acts or events, it will be appreciated that the illustrated ordering of such acts or events are not to be interpreted in a limiting sense. For example, some acts may occur in different orders and/or concurrently with other acts or pre apart from those illustrated and/or described herein. In addition, not all illustrated acts may be required to implement one or more aspects or embodiments of the description herein. Further, one or more of the acts depicted herein may be carried out in one or more separate acts and/or phases.

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

As it employed in the subject specification, the term "processor" can refer to substantially any computing processing unit or device including, but not limited to including, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit, a digital signal processor, a field programmable gate array, a programmable logic controller, a complex programmable logic device, a discrete gate or transistor logic, discrete hardware components, or any combination thereof designed to perform the functions and/or processes described herein. Processors can exploit nano-scale architectures such as, but not limited to, molecular and quantum-dot based transistors, switches and gates, in order to optimize space usage or enhance performance of mobile devices. A processor may also be implemented as a combination of computing processing units.

In the subject specification, terms such as "store," "data store," data storage," "database," and substantially any other information storage component relevant to operation and functionality of a component and/or process, refer to "memory components," or entities embodied in a "memory," or components including the memory. It is noted that the memory components described herein can be either volatile memory or nonvolatile memory, or can include both volatile and nonvolatile memory.

By way of illustration, and not limitation, nonvolatile memory, for example, can be included in a memory, non-volatile memory (see below), disk storage (see below), and memory storage (see below). Further, nonvolatile memory can be included in read only memory, programmable read only memory, electrically programmable read only memory, electrically erasable programmable read only memory, or flash memory. Volatile memory can include random access memory, which acts as external cache memory. By way of illustration and not limitation, random access memory is available in many forms such as synchronous random access memory, dynamic random access memory, synchronous dynamic random access memory, double data rate synchronous dynamic random access memory, enhanced synchronous dynamic random access memory, Synchlink dynamic random access memory, and direct Rambus random access memory. Additionally, the disclosed memory components of systems or methods herein are intended to include, without being limited to including, these and any other suitable types of memory.

Examples can include subject matter such as a method, means for performing acts or blocks of the method, at least one machine-readable medium including instructions that, when performed by a machine cause the machine to perform acts of the method or of an apparatus or system for concurrent communication using multiple communication technologies according to embodiments and examples described herein.

Example 1 is an apparatus configured to be employed within a base station. The apparatus comprises baseband circuitry which includes a radio frequency (RF) interface and one or more processors. The one or more processors are configured to obtain channel information and data information for a user equipment (UE) device, determine control information for the UE device based on the obtained channel information and the data information, generate a channel format for the determined control information and having varied subband sizes, and provide the channel format to the RF interface for a downlink transmission to the UE device.

Example 2 includes the subject matter of Example 1, including or omitting optional elements, wherein the channel information includes a channel estimate determined by the UE device.

Example 3 includes the subject matter of any of Examples 1-2, including or omitting optional elements, wherein the data information includes a requested data bandwidth, a requested data rate, and latency for the UE device.

Example 4 includes the subject matter of any of Examples 1-3, including or omitting optional elements, wherein the control information includes resource allocation of data resources for the UE device.

Example 5 includes the subject matter of any of Examples 1-4, including or omitting optional elements, wherein the control information includes a physical resource block (PRB) offset for a data subband.

Example 6 includes the subject matter of any of Examples 1-5, including or omitting optional elements, wherein the one or more processors are configured to determine a control subband size and a data subband size for the channel format based on the channel information and/or the data information, wherein the control subband size and the data subband size are less than or equal to a channel width.

Example 7 includes the subject matter of any of Examples 1-6, including or omitting optional elements, wherein the control subband size is less than the channel width and the data subband size is equal to the channel width.

Example 8 includes the subject matter of any of Examples 1-7, including or omitting optional elements, wherein the one or more processors are configured to determine a resource granularity for the channel format.

Example 9 includes the subject matter of any of Examples 1-8, including or omitting optional elements, wherein the one or more processors are configured to determine a number of physical resource blocks (PRBs) to allocate for the UE device.

Example 10 includes the subject matter of any of Examples 1-9, including or omitting optional elements, wherein the channel format includes two or more control information stages to include the determined control information.

Example 11 is an apparatus configured to be employed within a user equipment (UE) device comprising baseband circuitry. The baseband circuitry includes a radio frequency (RF) interface and one or more processors. The one or more processors are configured to identify control information for the UE from the downlink control information, where the control information for the UE has a control subband size, and determine a data resource allocation from the control information for the UE.

Example 12 includes the subject matter of Example 11, including or omitting optional elements, wherein the control information for the UE includes a data subband size.

Example 13 includes the subject matter of any of Examples 11-12, including or omitting optional elements, wherein the data subband size is greater than the control subband size.

Example 14 includes the subject matter of any of Examples 11-13, including or omitting optional elements, wherein the data subband size is equal to the control subband size and a resource allocation of a control subband is the data resource allocation.

Example 15 includes the subject matter of Examples 11-14, including or omitting optional elements, wherein the one or more processors are configured to use the data resources for uplink transmission via the RF interface.

Example 16 includes the subject matter of any of Examples 11-15, including or omitting optional elements, wherein the one or more processors are configured to use the data resources for a downlink data transmission via the RF interface.

Example 17 includes the subject matter of any of Examples 11-16, including or omitting optional elements, wherein the data resource allocation includes an offset from control resources.

Example 18 includes the subject matter of any of Examples 11-17, including or omitting optional elements, wherein the control subband size for the UE is varied from a second control subband size for a second UE.

Example 19 is one or more computer-readable media having instructions that, when executed, cause a base station to obtain data rate information for a user equipment (UE) device; determine a control subband size for a control subband and a data subband size for a data subband for the UE device; allocate data resources for the data subband; and generate control information for the UE device having the control subband size and including the data subband size and location of the allocated data resources for the data subband.

Example 20 includes the subject matter of Example 19, including or omitting optional elements, wherein the instructions, when executed, further cause the base station to generate a downlink channel for the control information, the control subband and the data subband.

Example 21 includes the subject matter of any of Examples 19-20, including or omitting optional elements, wherein the instructions, when executed, further cause the base station to transmit the downlink channel.

Example 22 is an apparatus configured to be employed within a user equipment (UE) device. The apparatus includes a means to receive a downlink transmission; a means to obtain downlink control information from the downlink transmission; and a means to obtain a data resource allocation from the obtained downlink control information, wherein the data resource allocation has a subband size varied from a subband size of the downlink control information.

Example 23 includes the subject matter of Example 22, including or omitting optional elements, further comprising a means to decode downlink data from the downlink transmission.

Example 24 includes the subject matter of any of Examples 22-23, including or omitting optional elements, wherein the downlink transmission includes control information for a second UE device located within a second control subband.

It is to be understood that aspects described herein can be implemented by hardware, software, firmware, or any combination thereof. When implemented in software, functions can be stored on or transmitted over as one or more instructions or code on a computer-readable medium. Computer-readable media includes both computer storage media and communication media including any medium that facilitates transfer of a computer program from one place to another. A storage media or a computer readable storage device can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or other tangible and/or non-transitory medium, that can be used to carry or store desired information or executable instructions. Also, any connection is properly termed a computer-readable medium. For example, if software is transmitted from a website, server, or other remote source using a coaxial cable, fiber optic cable, twisted pair, digital subscriber line (DSL), or wireless technologies such as infrared, radio, and microwave, then coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Various illustrative logics, logical blocks, modules, and circuits described in connection with aspects disclosed herein can be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform functions described herein. A general-purpose processor can be a microprocessor, but, in the alternative, processor can be any conventional processor, controller, microcontroller, or state machine. A processor can also be implemented as a combination of computing devices, for example, a combination of a DSP and a microprocessor, a plurality of microprocessors, one or more microprocessors in conjunction with a DSP core, or any other such configuration. Additionally, at least one processor can comprise one or more modules operable to perform one or more of the s and/or actions described herein.

For a software implementation, techniques described herein can be implemented with modules (e.g., procedures, functions, and so on) that perform functions described herein. Software codes can be stored in memory units and executed by processors. Memory unit can be implemented within processor or external to processor, in which case memory unit can be communicatively coupled to processor through various means as is known in the art. Further, at least one processor can include one or more modules operable to perform functions described herein.

Techniques described herein can be used for various wireless communication systems such as CDMA, TDMA, FDMA, OFDMA, SC-FDMA and other systems. The terms "system" and "network" are often used interchangeably. A CDMA system can implement a radio technology such as Universal Terrestrial Radio Access (UTRA), CDMA1800, etc. UTRA includes Wideband-CDMA (W-CDMA) and other variants of CDMA. Further, CDMA1800 covers IS-1800, IS-95 and IS-856 standards. A TDMA system can implement a radio technology such as Global System for Mobile Communications (GSM). An OFDMA system can implement a radio technology such as Evolved UTRA (E-UTRA), Ultra Mobile Broadband (UMB), IEEE 802.11 (Wi-Fi), IEEE 802.16 (WiMAX), IEEE 802.18, Flash-OFDM, etc. UTRA and E-UTRA are part of Universal Mobile Telecommunication System (UMTS). 3GPP Long Term Evolution (LTE) is a release of UMTS that uses E-UTRA, which employs OFDMA on downlink and SC-FDMA on uplink. UTRA, E-UTRA, UMTS, LTE and GSM are described in documents from an organization named "3rd Generation Partnership Project" (3GPP). Additionally, CDMA1800 and UMB are described in documents from an organization named "3rd Generation Partnership Project 2" (3GPP2). Further, such wireless communication systems can additionally include peer-to-peer (e.g., mobile-to-mobile) ad hoc network systems often using unpaired unlicensed spectrums, 802.xx wireless LAN, BLUETOOTH and any other short- or long-range, wireless communication techniques.

Single carrier frequency division multiple access (SC-FDMA), which utilizes single carrier modulation and frequency domain equalization is a technique that can be utilized with the disclosed aspects. SC-FDMA has similar performance and essentially a similar overall complexity as those of OFDMA system. SC-FDMA signal has lower peak-to-average power ratio (PAPR) because of its inherent single carrier structure. SC-FDMA can be utilized in uplink communications where lower PAPR can benefit a mobile terminal in terms of transmit power efficiency.

Moreover, various aspects or features described herein can be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., EPROM, card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data. Additionally, a computer program product can include a computer readable medium having one or more instructions or codes operable to cause a computer to perform functions described herein.

Communications media embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

Further, the actions of a method or algorithm described in connection with aspects disclosed herein can be embodied directly in hardware, in a software module executed by a processor, or a combination thereof. A software module can reside in RAM memory, flash memory, ROM memory, EPROM memory, EEPROM memory, registers, a hard disk, a removable disk, a CD-ROM, or any other form of storage medium known in the art. An exemplary storage medium can be coupled to processor, such that processor can read information from, and write information to, storage medium. In the alternative, storage medium can be integral to processor. Further, in some aspects, processor and storage medium can reside in an ASIC. Additionally, ASIC can reside in a user terminal. In the alternative, processor and storage medium can reside as discrete components in a user terminal. Additionally, in some aspects, the s and/or actions of a method or algorithm can reside as one or any combination or set of codes and/or instructions on a machine-readable medium and/or computer readable medium, which can be incorporated into a computer program product.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

In particular regard to the various functions performed by the above described components (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the disclosure. In addition, while a particular feature may have been disclosed with respect to only one of several implementations, such feature may be combined with one or more other features of the other implementations as may be desired and advantageous for any given or particular application.

What is claimed is:

1. An apparatus for a base station, comprising baseband circuitry having:
   a radio frequency (RF) interface; and
   one or more processors configured to:
      obtain channel information and data information for a user equipment (UE) device;
      determine control information for the UE device based on the obtained channel information and data information;
      generate a channel format for the determined control information and having varied control subband sizes; and
      provide the channel format to the RF interface for a downlink transmission to the UE device.

2. The apparatus of claim 1, wherein the channel information include a channel estimate determined by the UE device.

3. The apparatus of claim 1, wherein the data information includes a requested data bandwidth, a requested data rate, and latency for the UE device.

4. The apparatus of claim 1, wherein the control information includes resource allocation of data resources for the UE device.

5. The apparatus of claim 1, wherein the control information includes a physical resource block (PRB) offset for a data subband.

6. The apparatus of claim 1, wherein the one or more processors are configured to determine a control subband size and a data subband size for the channel format based on the channel information and/or the data information, wherein the control subband size and the data subband size are less than or equal to a channel width.

7. The apparatus of claim 6, wherein the control subband size is less than the channel width and the data subband size is equal to the channel width.

8. The apparatus of claim 1, wherein the one or more processors are configured to determine a resource granularity for the channel format.

9. The apparatus of claim 1, wherein the one or more processors are configured to determine a number of physical resource blocks (PRBs) to allocate for the UE device.

10. The apparatus of claim 1, wherein the channel format includes two or more control information stages to include the determined control information.

11. An apparatus for a user equipment (UE) device, comprising baseband circuitry having:
    a radio frequency (RF) interface configured to receive a downlink channel having downlink control information from a base station; and
    one or more processors configured to:
       identify control information for the UE from the downlink control information, where the control information for the UE has a control subband size and a data subband size; and
       determine a data resource allocation from the control information for the UE.

12. The apparatus of claim 11, wherein the control information for the UE includes the data subband size being different from the control subband size.

13. The apparatus of claim 12, wherein the data subband size is greater than the control subband size.

14. The apparatus of claim 11, wherein the data subband size is equal to the control subband size and a resource allocation of a control subband is the data resource allocation.

15. The apparatus of claim 11, wherein the one or more processors are configured to identify data resources using the control information and use the data resources for uplink transmission via the RF interface.

16. The apparatus of claim 11, wherein the one or more processors are configured to identify data resources using the control information and use the data resources for a downlink data transmission via the RF interface.

17. The apparatus of claim 11, wherein the data resource allocation includes an offset from control resources.

18. The apparatus of claim 11, wherein the control subband size for the UE is varied from a second control subband size for a second UE.

19. One or more non-transitory computer-readable media having instructions that, when executed, cause a base station to:
    obtain data rate information for a first user equipment (UE) device;
    determine a control subband size for a control subband and a data subband size for a data subband for the UE device based on the data rate information;
    allocate data resources for the data subband; and
    generate control information for the first UE device having the control subband size and including location of the allocated data resources for the data subband;
    wherein the data subband size is larger than the control subband size.

20. The non-transitory computer-readable media of claim 19, wherein the instructions, when executed, further cause the base station to generate a downlink channel for the control subband and the data subband and to transmit the downlink channel.

21. The non-transitory computer-readable media of claim 20, wherein the instructions, when executed, further cause the base station to:
    obtain second data rate information for a second user equipment (UE) device;

determine a second control subband size for a second control subband and a second data subband size for a second data subband for the second UE device based on the second data rate information;

allocate second data resources for the second data subband; and generate second control information for the second UE device having the second control subband size and including location of the second allocated data resources for the second data subband;

wherein the second data subband size is equal to the data subband size while the second control subband size is different than the control subband size.

22. An apparatus for a user equipment (UE) device comprising:
   a means to receive a downlink transmission;
   a means to obtain downlink control information from the downlink transmission; and
   a means to obtain a data resource allocation from the obtained downlink control information, wherein the data resource allocation has a subband size varied from a subband size of the downlink control information.

23. The apparatus of claim 22, further comprising a means to decode downlink data from the downlink transmission.

24. The apparatus of claim 22, wherein the downlink transmission includes control information for a second UE device.

* * * * *